Patented May 10, 1927.

1,627,636

UNITED STATES PATENT OFFICE.

CECIL JOHN TURRELL CRONSHAW AND WILLIAM JOHNSON SMITH NAUNTON, OF MANCHESTER, ENGLAND, ASSIGNORS TO BRITISH DYESTUFFS CORPORATION LIMITED, OF MANCHESTER, ENGLAND.

VULCANIZATION OF RUBBER.

No Drawing. Application filed June 28, 1926, Serial No. 119,265, and in Great Britain September 9, 1924.

This invention relates to the vulcanization of rubber; and it comprises a method of facilitating or accelerating the vulcanization of rubber wherein a rubber mix of an ordinary composition receives an addition of a small amount of a diarylguanidine containing an alkylated amino group in each of the aryl nuclei and the admixture is thereafter vulcanized or cured; and it also comprises as a new composition of matter a rubber mix adapted for vulcanization and containing rubber, sulphur and other useful ingredients and, in addition, a diarylguanidine containing an alkylated amino group in each of the aryl nuclei; all as more fully hereinafter set forth and as claimed.

In the vulcanization or curing of rubber, it has been found that the addition of small amounts of various bodies to the rubber mix much facilitates and accelerates vulcanization, producing a more uniform cure; and the use of these accelerators is now standard practice. Very many substances have been proposed for this purpose and a number are in use. The theory regarding their mode of action is as yet uncertain; but it is an ascertained fact that many substances of varied chemical composition exercise the action and their specific results are different. Among the substances which have been used are diarylguanidines.

We have found that by using certain derivatives of diarylguanidines, namely, diarylguanidines containing an alkylated amino group in each of the aryl nuclei, better results are obtained. These bodies have an accelerating action and this, under suitable conditions, without any pre-cure vulcanization taking place.

In another application, Serial No. 51,999½, filed August 24, 1925, whereof the present application is a continuation in part, we have described various processes of making these diarylguanidines and the products. The present application relates to their employment in vulcanization.

The new compounds have the composition indicated by the following formula:—

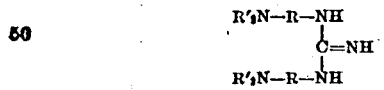

in which R stands for the aryl group, and R' for hydrogen or alkyl groups.

To obtain the new compounds, we prepare the corresponding diaryl-thio-ureas containing an alkylated amino group in each of the aryl residues and desulphurize these thioureas in the presence of ammonia in a suitable manner. Thus, for instance, we prepare dimethyl-amino-phenyl-thio-urea by the condensation of unsymmetrical dimethyl-p-phenylene-diamine with carbon bisulphide in the usual way or mono-ethyl-amino-o-tolyl-thio urea is prepared similarly from mono-ethyl-p-toluylene-diamine. On desulphurizing either of these thio-ureas in the presence of ammonia, there are obtained in the former case tetra-methyl-p.p-diaminodiphenyl-guanidine, and the latter diethyl-p.p-diamino-di-o-tolyl-guanidine.

The following example will serve to illustrate the manner in which the new products can be made: Unsym-dimethyl-p-phenylenediamine sulphate is dissolved in dilute alcohol, using, say a batch of 180 pounds, and after the addition of 240 pounds of carbon disulphide the requisite amount of caustic soda liquor to set free the base is added and the mixture is heated in a vessel provided with a reflux condenser until the reaction is complete when the excess of carbon disulphide is recovered by distillation. The 135 pounds of the thio-urea, suspended in a solution of 25 pounds of ammonium chloride in dilute alcohol, are desulphurized with the requisite amount of white lead or lead oxide. After the replacement of the alcohol by hot water, the lead sulphide and excess desulphurizing agent are removed by filtration and the filtrate is run into hot dilute caustic soda solution when the product is precipitated and removed by filtration. The yield is substantially theoretical. The products of the process described have the general composition indicated by the general formula ante and are valuable as accelerators for use in the vulcanization of rubber.

In a specific embodiment of our invention, using an ordinary mixture of 100 parts smoked sheet, 10 parts zinc oxide and 10 parts sulphur, tetramethyldiaminodiphenylguanidine displays very many advantages over ordinary diarylguanidines, diphenylguanidine and diorthotolylguanidine. Using 0.469 parts of tetramethyldiaminodiphenylguanidine there is secured a much greater tensile strength and a better elongation as compared with the results obtained by using corresponding quantities of diphenylguanidine or diorthotolylguanidine.

What we claim is:—

1. In the vulcanization of rubber, the process which comprises adding to the mixture to be vulcanized a small proportion of a diaryl guanidine containing an alkylated amino group in each of the aryl nuclei and then heating the mass in the well known way.

2. In the vulcanization of rubber, the process which comprises adding to the mixture to be vulcanized a small proportion of tetramethyl-diamino-diphenyl-guanidine and then vulcanizing.

3. As a new composition of matter, a rubber mix containing besides rubber, sulphur and any other ingredients a diarylguanidine containing an alkylated amino group in each of the aryl nuclei.

In testimony whereof we have hereunto affixed our names.

CECIL JOHN TURRELL CRONSHAW.
WILLIAM JOHNSON SMITH NAUNTON.